(12) United States Patent
Soryal

(10) Patent No.: US 12,143,417 B2
(45) Date of Patent: Nov. 12, 2024

(54) AUTONOMOUS VEHICLE DOS RESISTANT COMMUNICATION SYSTEM USING ACOUSTIC COMMUNICATIONS

(71) Applicant: AT&T Intellectual Property I, L.P., Atlanta, GA (US)

(72) Inventor: Joseph Soryal, Glendale, NY (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 0 days.

(21) Appl. No.: 18/124,680

(22) Filed: Mar. 22, 2023

(65) Prior Publication Data

US 2023/0300169 A1 Sep. 21, 2023

Related U.S. Application Data

(63) Continuation of application No. 16/443,480, filed on Jun. 17, 2019, now Pat. No. 11,637,860.

(51) Int. Cl.
| | |
|---|---|
| *H04L 9/40* | (2022.01) |
| *B60W 50/14* | (2020.01) |
| *G06V 20/20* | (2022.01) |
| *G08B 25/00* | (2006.01) |
| *G08B 25/01* | (2006.01) |

(52) U.S. Cl.
CPC ......... *H04L 63/1458* (2013.01); *B60W 50/14* (2013.01); *G06V 20/20* (2022.01); *G08B 25/006* (2013.01); *G08B 25/016* (2013.01); *H04L 63/1416* (2013.01); *H04L 63/1425* (2013.01); *B60W 2420/403* (2013.01); *B60W 2420/54* (2013.01)

(58) Field of Classification Search
CPC ............. H04L 63/1458; H04L 63/1416; H04L 63/1425; G06V 20/20; B60W 50/14; B60W 2420/403; B60W 2420/54; G08B 25/006; G08B 25/016
USPC .......................................................... 726/22
See application file for complete search history.

(56) References Cited

U.S. PATENT DOCUMENTS

| | | | |
|---|---|---|---|
| 7,103,460 B1 | 9/2006 | Breed | |
| 10,168,418 B1 * | 1/2019 | Al-Stouhi | ............. G01S 13/931 |
| 10,453,342 B2 * | 10/2019 | Biehle | ..................... H04W 4/46 |

(Continued)

FOREIGN PATENT DOCUMENTS

| | | | | |
|---|---|---|---|---|
| EP | 1237385 A2 | 9/2002 | | |
| EP | 1437272 A1 * | 7/2004 | ......... | B60R 25/1004 |

(Continued)

OTHER PUBLICATIONS

Rong-Ling, et al., "The Vibration Parameter Fault Diagnosis for Automobile Engine Based on AN FIS", vol. 3, Publisher: IEEE, 2010.

(Continued)

*Primary Examiner* — Tuan C To
(74) *Attorney, Agent, or Firm* — Andrew Gust; Guntin & Gust, PLC

(57) ABSTRACT

A method includes determining, by a vehicle, a failure with a computer or telecommunications system operating in the vehicle and when a failure is detected, activating an acoustic system on the vehicle, detecting a vibration by the vehicle; and transmitting an audible signal responsive to the detecting step. The audible signal may include words in a human vocabulary.

20 Claims, 8 Drawing Sheets

(56) References Cited

U.S. PATENT DOCUMENTS

| | | | |
|---|---|---|---|
| 10,466,717 B1 * | 11/2019 | Su | H04W 4/44 |
| 10,608,312 B2 * | 3/2020 | Henry | H01P 3/10 |
| 11,153,721 B2 * | 10/2021 | Graefe | H04W 4/38 |
| 11,237,555 B1 | 2/2022 | Chan et al. | |
| 11,637,860 B2 * | 4/2023 | Soryal | H04W 12/12 |
| | | | 726/22 |
| 2002/0123833 A1 | 9/2002 | Sakurai et al. | |
| 2004/0162650 A1 | 8/2004 | Kueperkoch et al. | |
| 2007/0282496 A1 | 12/2007 | Morimoto | |
| 2011/0251735 A1 | 10/2011 | Hayashi | |
| 2013/0225111 A1 | 8/2013 | Hatton et al. | |
| 2016/0321125 A1 | 11/2016 | Kang et al. | |
| 2018/0293812 A1 | 10/2018 | Miller et al. | |
| 2019/0043358 A1 | 2/2019 | Biehle et al. | |
| 2019/0069051 A1 * | 2/2019 | Al-Stouhi | H04Q 9/00 |
| 2019/0132709 A1 * | 5/2019 | Graefe | G05D 1/028 |
| 2019/0327415 A1 | 10/2019 | Prabhakar et al. | |
| 2020/0098254 A1 * | 3/2020 | Oyabu | H04B 7/06 |
| 2020/0324675 A1 * | 10/2020 | Yamamoto | B60N 2/90 |

FOREIGN PATENT DOCUMENTS

| | | | | |
|---|---|---|---|---|
| EP | 1684250 A2 * | 7/2006 | | G06Q 30/02 |
| JP | 2003063356 A | 3/2003 | | |
| WO | WO-0127897 A2 * | 4/2001 | | G06Q 30/02 |
| WO | WO-2015083009 A1 * | 6/2015 | | B60K 31/0066 |
| WO | 2017074381 A1 | 5/2017 | | |

OTHER PUBLICATIONS

Wu, Xiaobing, et al., "The Application of Multi-sensors Fusion in Vehicle Transmission System Fault Diagnosis", vol. 2, Publisher: IEEE, 2007.

\* cited by examiner

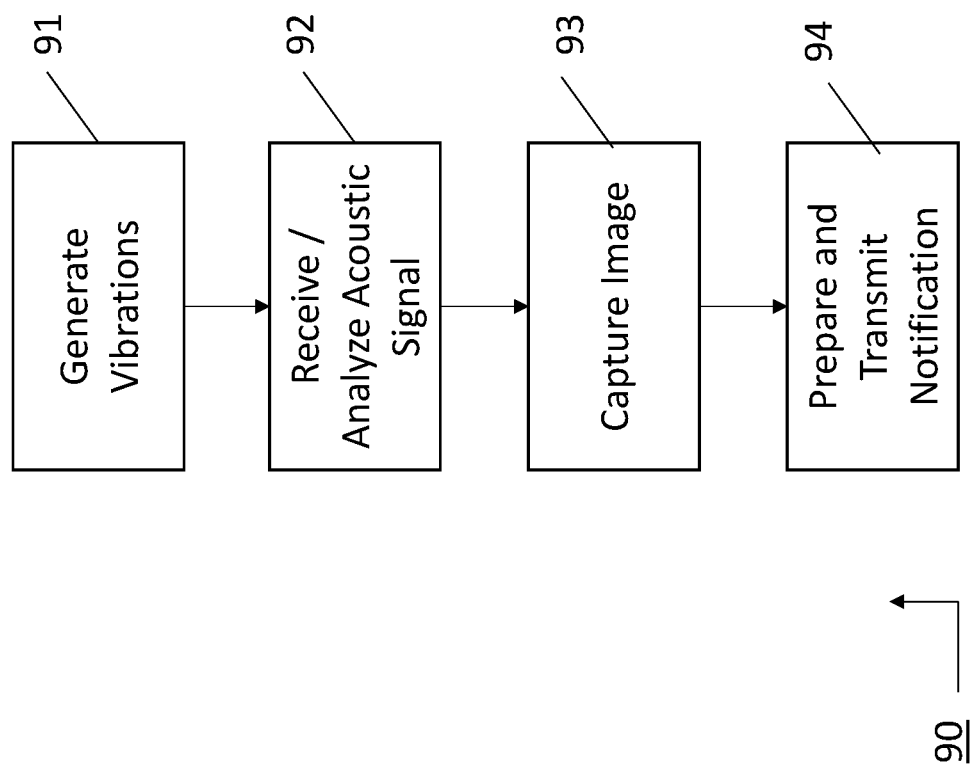

AUTONOMOUS VEHICLE DOS RESISTANT COMMUNICATION SYSTEM USING ACOUSTIC COMMUNICATIONS

CROSS REFERENCE TO RELATED APPLICATIONS

This application is a continuation of U.S. patent application Ser. No. 16/443,480 filed on Jun. 17, 2019. All sections of the aforementioned application are incorporated herein by reference in their entirety.

TECHNICAL FIELD

This disclosure is directed to a system and method for assisting autonomous and semi-autonomous vehicles in an emergency situation in the event of a denial of service attack, and more specifically, to utilizing acoustic communications when normal network communications are blocked or degraded.

BACKGROUND

Connected vehicles provide ever-increasing useful navigation and operational assistance to vehicles. As connected vehicle systems become more advanced, the vehicles may become semi-autonomous or autonomous. The more autonomous a vehicle may be, the more vulnerable the vehicle may be to hacking or other attacks. For example, autonomous vehicles may be vulnerable to denial of service (DOS) attack that could cripple the vehicles own sensory and communications systems. If such an attack occurs, the results could be catastrophic. At a minimum, a DoS attack may cut off any vehicle-to-vehicle (V2V) communications as well as communications roadside equipment. If the DoS attack happened when the vehicle was idle, it would be possible that the vehicle be held hostage in a parking position preventing the owner from invoking the system and communicating with the vehicle to pick them up.

There is a need to develop systems and methods to overcome a DoS attack which is not reliant on V2V communications or cellular communications with the vehicle.

SUMMARY

The present disclosure is directed to a method including activating an acoustic system on a vehicle, detecting a vibration and transmitting an audible signal responsive to the detecting step wherein the audible signal comprises words in a human vocabulary. The method may further include determining, by the vehicle, a failure with a computer system operating in the vehicle and wherein the activating step is performed responsive to the determining step. The failure may be the result of a denial of service attack.

In an aspect, the vibration may be generated by a passing vehicle and in another aspect, the vibration may be generated by roadside equipment.

The disclosure is also directed to a method including receiving an audible signal from a vehicle, capturing an image of the vehicle, creating a notification message relating to the vehicle, and transmitting the notification. The audible signal may be because of a denial of service attack. The audible signal may include words in a human vocabulary and the method may further include analyzing the audible signal to create the notification message.

In an aspect, the receiving, capturing, creating and transmitting steps are performed by roadside equipment and wherein the roadside equipment generates a vibration to be detected by the vehicle. In another aspect, the receiving, capturing, creating and transmitting steps are performed by second vehicle and the vibration is generated by the second vehicle traveling near the vehicle. In an aspect, the second vehicle may perform a self-test to determine whether computer systems of the second vehicle are operational and then storing the notification message if the computer systems are not operational. The stored notification message may then be transmitted when the second vehicle determines that the computers systems are operational. In an aspect, the notification message is transmitted to a server wherein the server determines the identity of the vehicle and a process for aiding the vehicle. Such assistance may include a notification to law enforcement.

The disclosure is also directed to a system including a connected vehicle having a plurality of sensors and a telecommunications system interface, a diagnostic tool configured to determine the status of the sensors and the telecommunications system interface, an acoustic system having vibration sensors configured to receive vibrations generated external to the vehicle, and a speaker configured to transmit audible signals in response to the received vibrations when the diagnostic tool indicates a failure of one of the plurality of sensors or the telecommunications system interface. The system may further include a sound filter configured to receive an audible signal and a camera to capture an image of a second vehicle that generated the audible signal.

BRIEF DESCRIPTION OF THE DRAWINGS

Aspects of the herein described telecommunications network and systems and methods for controlling vehicular traffic are described more fully with reference to the accompanying drawings, which provide examples. In the following description, for purposes of explanation, numerous specific details are set forth in order to provide an understanding of the variations in implementing the disclosed technology. However, the instant disclosure may take many different forms and should not be construed as limited to the examples set forth herein. Where practical, like numbers refer to like elements throughout.

FIG. 8 is an illustration of an exemplary flow diagram of in accordance with the present disclosure.

DETAILED DESCRIPTION

System Overview. The system utilizes a combination of fixed and mobile assets to foster communications between vehicles and between a vehicle and roadside equipment. The system will be described in terms of an autonomous vehicle, but it will be understood that the system may be useful in semi-autonomous vehicles and other connected vehicle applications.

In an aspect, the system may include vibration sensors incorporated into or applied on the autonomous vehicle. The vibration sensors may be programmed to detect vibrations from passing vehicles or from fixed infrastructure assets.)

In a normal operation, the vibration sensors may be disabled or the inputs to the vibration sensors simply be ignored. Under such normal operating conditions, the autonomous vehicle may continuously or periodically conduct self-test or other diagnostics to determine that all or at least a sufficient majority of its sensors and communications systems are operational. Such self-tests or diagnostics may be performed while the vehicle is moving, stopped, parked, or even with the vehicle's engine turned off. Provided the self-tests or diagnostics exceed passing thresholds, then inputs to the vibration sensors, if any, will be ignored.

However, if as a result of the self-tests or other diagnostics, it is determined that critical sensors or communication equipment is not available due to DOS attacks or other failures, then the vibration sensors will be activated or the inputs to the vibration sensors actively monitored. The vibration sensors will check for vibrations from passing vehicles or roadside equipment. When such vibrations are detected and perhaps classified as pertaining to a type of vibration, the vehicle under attack may attempt to communicate with the passing vehicle or the roadside equipment using sound signals of varying frequencies.

The system may also include sound filters on the passing cars and on roadside equipment. Such sound filters would be always "ON" and listening for audio sounds on varying frequencies. The sound filters may distinguish the environmental sounds that are considered normal with the sound emanating from a vehicle under attack. The passing vehicle or roadside equipment receiving the distress message from the vehicle under attack may then relay these messages to nearby cars, police, and other roadside infrastructure.

If the Dos attacks are limited to a geographical region and the passing vehicle receiving the distress message itself is unable to communicate, the vehicle receiving the distress message may store it gets out of the DoS attacked geographical region. Any audio messages may include the authentication credentials similar to normal V2V communication protocols and may include relevant information about the vehicle under attack.

Figure 1:
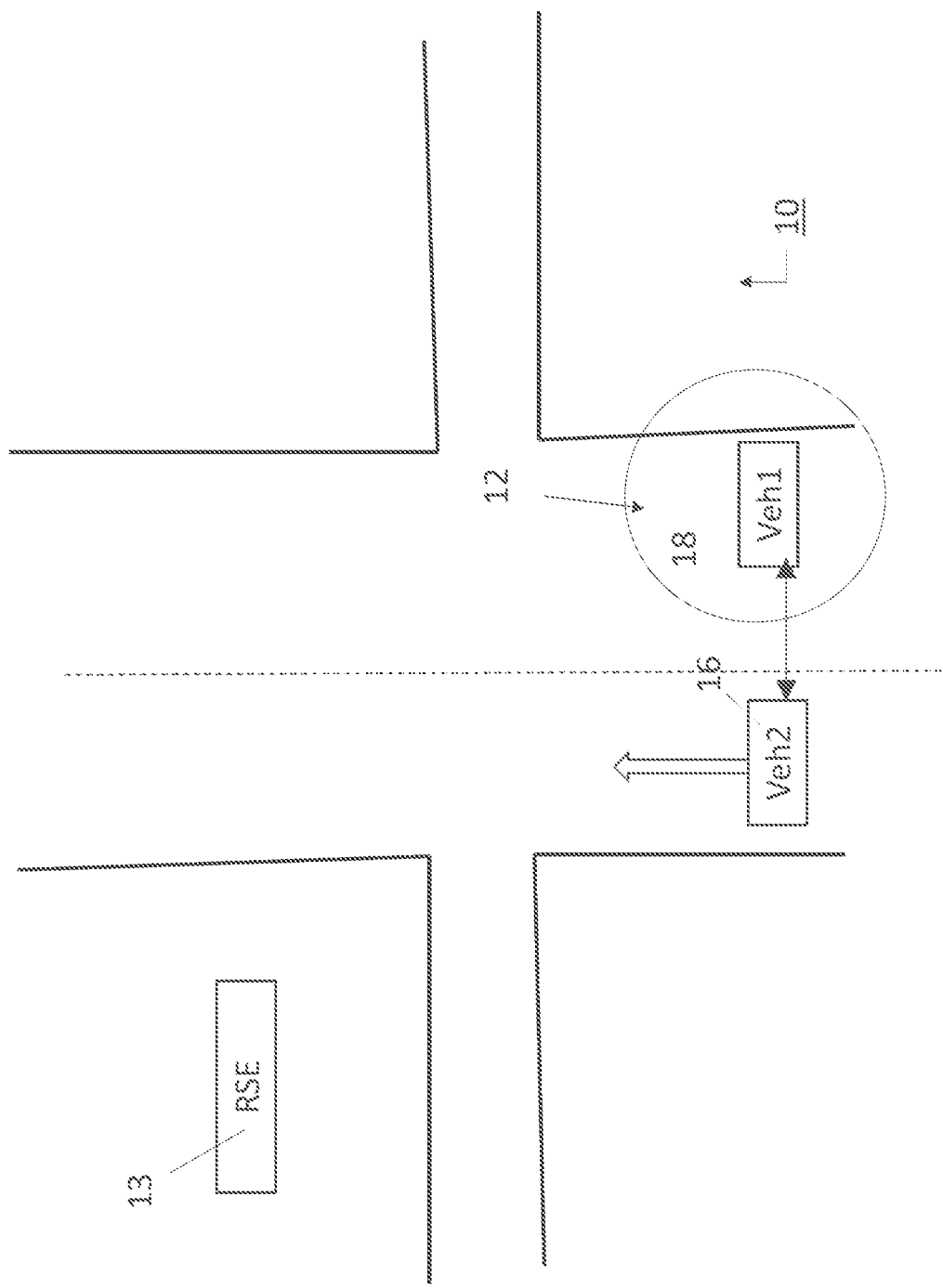
FIG. 1 is a block diagram of an exemplary operating environment in accordance with the present disclosure.
Figure 2:
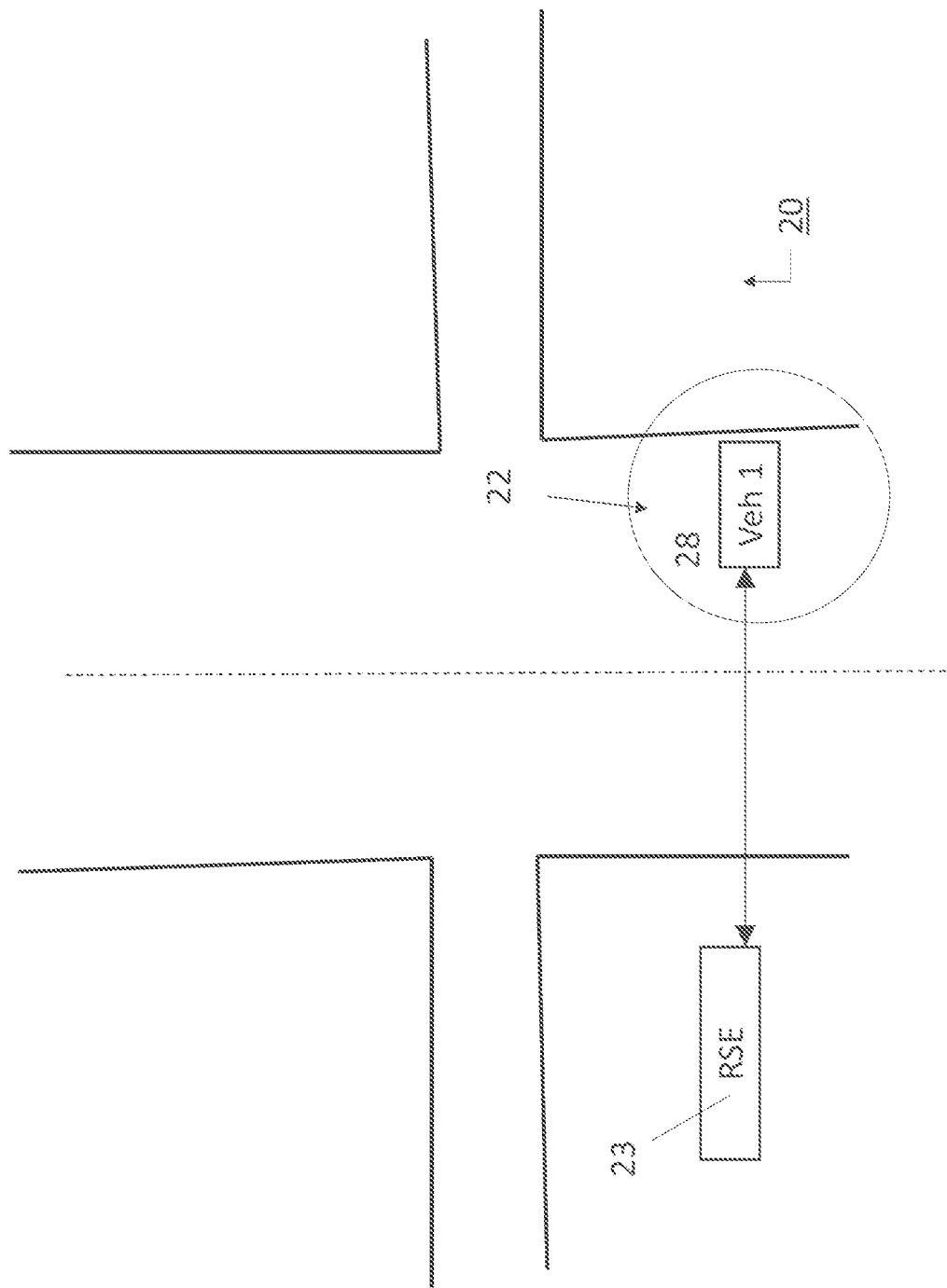
FIG. 2 is a block diagram of another exemplary operating environment in accordance with the present disclosure.
Figure 3:
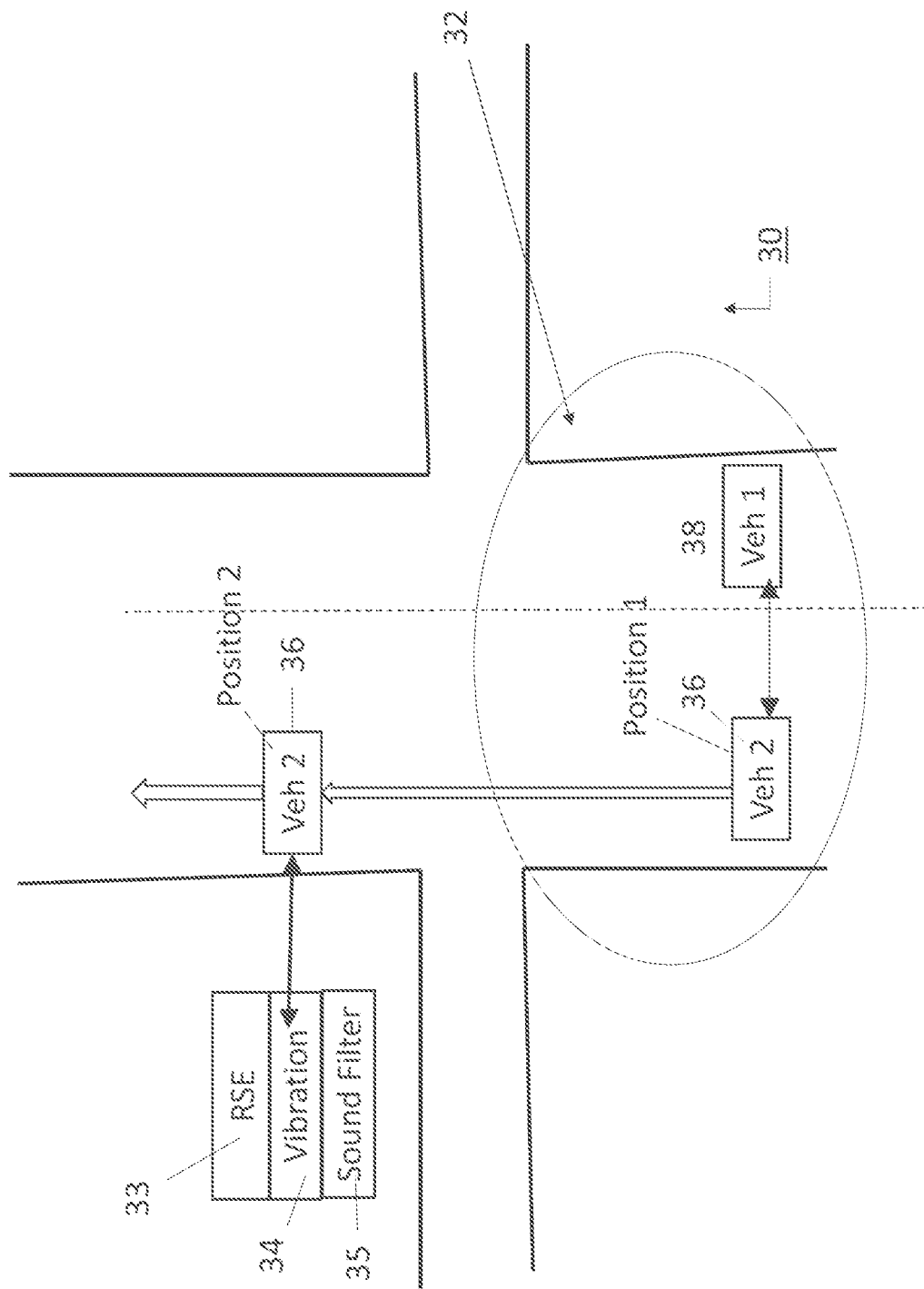
FIG. 3 is a block diagram of another exemplary operating environment in accordance with the present disclosure.

Operating Environment. FIGS. 1 through 3 illustrate three exemplary environments in which the system and method of the present disclosure may operate. With reference to FIG. 1, there is shown a system 10 having a vehicle designated as VEH1 18 which may be under a localized Dos attack in a region designated by area 12. In such a situation, VEH1 18 may sense that the it is being saturated with signals in a DoS attack or otherwise fail a periodic diagnostic self-test. VEH1 18 may then activate its acoustic system 50, described in more detail below with respect to FIG. 4 when the acoustic system 50 detects a passing vehicle designated as VEH2 16. VEH2 16 also may have an acoustic system 50 which "bears" the audible distress sounds from VEH1 18 and then can generate an emergency notification. Roadside equipment 13 described in more detail below with respect to FIG. 5, may remain unused in this configuration.

A similar exemplary environment is shown in FIG. 2. There is shown a system 20 having a vehicle designated as VEH1 28 which may be under a localized Dos attack in a region designated by area 22. In such a situation, VEH1 28 may sense that the it is being saturated with signals in a DOS attack or otherwise fails a periodic diagnostic self-test. VEH1 18 may then activate its acoustic system 50. The acoustic system 50 may detect a vibration being generated by vibration function 24 as it passes roadside equipment 23. Roadside equipment 23 may hear the audible distress sounds from VEH1 28 and then can generate an emergency notification. In this example configuration, a passing vehicle is not needed to convey an emergency notification with respect to VEH1 28.

Turning now to the exemplary operating environment of FIG. 3, there is shown a system 30 having a vehicle designated as VEH1 28 which may be under a broader DoS attack in a region designated by area 32. In such a situation, VEH1 38 may sense that the it is being saturated with signals in a DOS attack or otherwise fail a periodic diagnostic self-test. VEH1 38 may then activate its acoustic system 50. When the acoustic system 50 detects 50 detects a passing vehicle designated as VEH2 36 which may, for example, be in position 1 in the FIG. 32 it also may be unable to communicate an emergency notification. In such a situation, VEH2 36, in addition to enabling its own acoustic system 50 to detect vibrations, may record the acoustic information from VEH1 38, along with identification information such as location, vehicle type, and the like, for the generation of an emergency notification later when it escapes the DoS attach area 32, such as Location 2 in FIG. 3. When VEH2 36 is able to generate the emergency notification, it may do so. Alternatively, the acoustic system 50 of VEH2 36 may interact with roadside equipment 33 to convey its own information and that of VEH1 to the sound filter to generate the emergency notification.

It will be understood that these operating environments are exemplary only and there may be other combinations of vehicles under DoS attack in a geographic area interacting with additional roadside equipment to convey audible signals for the generation of emergency notifications.

Vehicle Description. Continuing with the description of the system environment with respect to FIG. 4, there is shown a vehicle 40 which may be an autonomous vehicle 40 equipped with one or more of on-board diagnostics and on-board OEM or aftermarket safety devices such as lane departure warnings, forward and rear collision warning and avoidance systems, blind spot monitoring, rear and 360 degree cameras, parking assistance, and other safety systems. There is shown a driver or driver-assist system 49 (used interchangeably herein) in vehicle 40 may be in communication with a cellular network and with edge infrastructure equipment. In an aspect, the driver system 49 may include a location function 41 which may use GPS, aGPS, time delay of arrival, or other location determination system or technologies. The location function 41 may include a turn-by-turn or other navigation system. The driver system 49 may also monitor vehicle speed through speed function 42. The driver system 49 may also include a sensor input function 43 to receive data from on-board sensors and cameras (not shown) and from fixed sensors on infrastructure equipment such as roadside equipment 16. The driver system 49 may also an external communications system 44 to transmit and receive messages. The driver system 49 may also include a warning system 45 to alert the vehicle 40 of external conditions. It will be understood that systems similar to driver system 49 may be integrated into a manned vehicle, semi-autonomous vehicle, or any kind of connected vehicle. There is also shown a credential function 46. Such credential function 46 includes the identification, registration and authentication to enable V2V communications and communications with roadside equipment 16. It will be understood that these functions are exemplary only and many other functions may be included in an autonomous vehicle 40.

Figure 4:
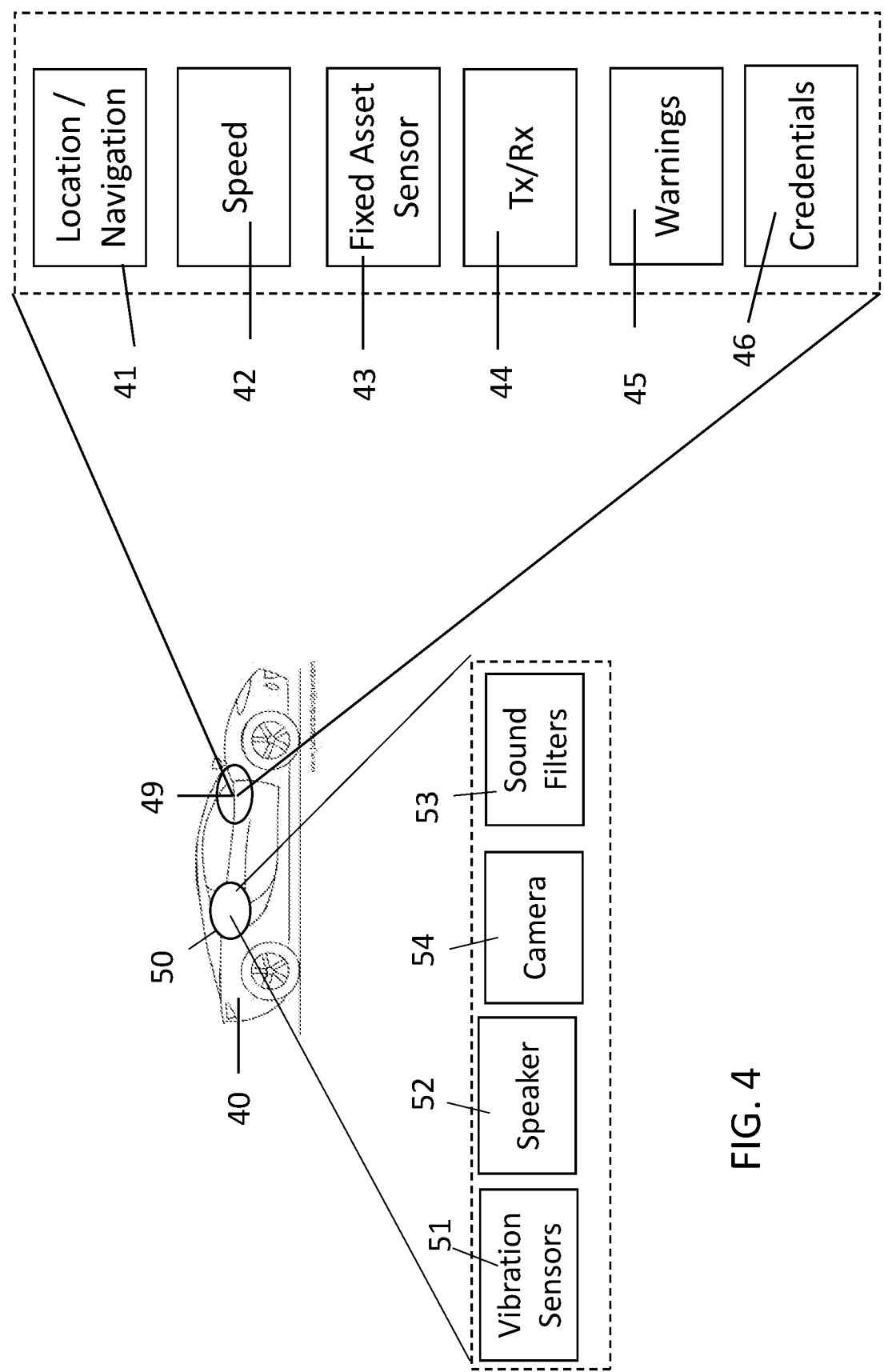
FIG. 4 depicts an exemplary functional diagram of a connected vehicle in accordance with the present disclosure.

Continuing with the description of FIG. 4, there is also shown an acoustic communication system 50 including one or more vibration sensors 51, one or more speakers 52 and one or more sound filters 53. As is known in the art, vibration sensor 51 may, for example, be a transducer used to detect vibration of a passing vehicle 14 or vibration generated by roadside equipment 16. A vibration sensor 51 may have a switch that will make or break contact when certain vibration levels are detected. The vibration sensor(s) 51 may be externally mounted on vehicle 40 or integral to the body of vehicle 40. The vibration sensor(s) 51 may be tuned to particular vibration frequencies that would match the expected frequencies of a passing vehicle 14 or the expected or standard frequency of vibrations generated by roadside equipment 16.

The vibration sensor 51 may be activated by vehicle 40 when driver system 49 is disabled because of sensor failure, Dos attacks or otherwise when operation of the vehicle 40 is adversely affected by driver system 49 problems. To determine whether there are such problems such as a DoS attack, the vehicle may run periodic diagnostic tests and alert the driver's mobile device or a server as to the status of the driving system 49. If the diagnostic test fails, the driver's mobile device or the server may be preliminarily notified either through a failure message, or, in a DoS situation, by the absence of receipt of a periodic report.

Once the vehicle 40 senses saturation through a DoS attack or otherwise fails its self-diagnostic testing, the vibration sensor 51 may be activated. Upon detection of a vibration, either from a passing vehicle 14 or from roadside equipment 16, the acoustic communication system 50 may start generating acoustic signals and broadcast those signals through speaker 52. The acoustic signals may be in the audio range from 20 Hz to 20,000 Hz and may include audible words such as "Help," "Call 911", "Trapped" or other keywords in a human vocabulary that identify that there is a problem and the vehicle 40 is in need of help.

For the purposes of this example, it will be assumed that a passing vehicle such as vehicle 16 will have a similar acoustic system 50 having one or more sound filters 53 and one or more cameras 54. The sound filter 53 may include a receiver configured to receive the acoustic signal generated by vehicle 40. Upon receipt of the acoustic signal, the sound filter may register the location and may capture an image of the vehicle 40 using camera 54 to record the vehicle type and plate number. The sound filter may then generate or cause to be generated a distress signal to generate a signal to a Public Safety Access Point (PSAP) or alert authorities using communication capabilities of the vehicle.

Figure 5:
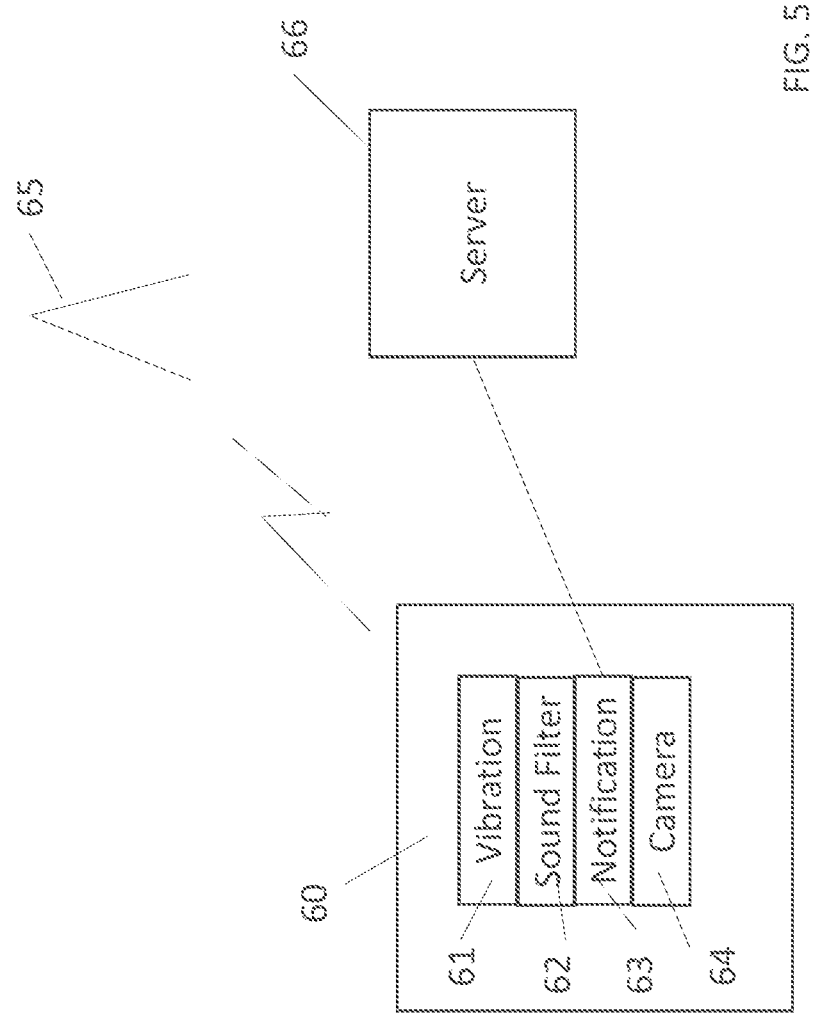
FIG. 5 depicts an exemplary functional diagram roadside equipment.

FIG. 5 shows an exemplary configuration of the roadside equipment 60 shown in FIGS. 1 to 3, respectively, and described in more detail herein. Roadside equipment 60 may have a vibration function 61, a sound filter 62, a notification function 63, and a camera function 64, among other functions. Roadside equipment 60 may be placed on buildings, street signs, traffic signals, or other transportation infrastructure equipment or may be standalone.

The vibration function 61 may be configured to transmit vibration signals either continuously or periodically from roadside equipment 60. The vibration function 61 may detect vibrations from passing vehicles and transmit vibration signals in response thereto or the vibration function 61 may transmit vibration signals independently of detecting any vibrations itself. The transmitted vibrations may be received by vibration sensors 51 of acoustic system 50 of passing vehicles. The transmitted vibrations from roadside equipment 60 may be tuned to particular frequencies that may be standardized for interoperability in the industry.

The sound filter 62 may operate similar to sound filter 53 described in connection with vehicle 40. The sound filter 62 may always be in an active listening mode and be tuned to the audible frequencies. The sound filter 62 may be configured to recognize and interpret some keywords being generated by acoustic system 50. The sound filter 62 may include a record function for later playback.

The roadside equipment 60 may also include a camera function 64. Upon receiving an audible alarm processed by the sound filter 62, the roadside equipment 60 may activate a camera function 64 which may capture an image detailing the make, model and color of a passing vehicle and the license plate of the passing vehicle. The roadside equipment may then corollate the captured image with the audible message received for notification of authorities using the notification function 63.

The notification function 63 may be connected to a cellular system 65, including but not limited to a 4G LTE or a 5G system and may, for example, be incorporated as an edge device in a 5G network. The notification function 63 may generate and transmit an emergency notification to police or a PSAP or to some other designated entity using such wireless communications. Alternatively, or additionally, the notification function 63 may communicate wirelessly or through a wired connection with a server 66 which may then map the received emergency notification message including images with data from a data base to identify the owner or other information regarding the vehicle and any individualized emergency procedures designated for that vehicle. For example, there may be different procedures for a personal vehicle than there would be for an official vehicle or a first responder vehicle. In an aspect, the emergency procedures may be conveyed by acoustic system 50 to the roadside equipment 60 based on the acoustic signature of the received audible signals.

Figure 6:
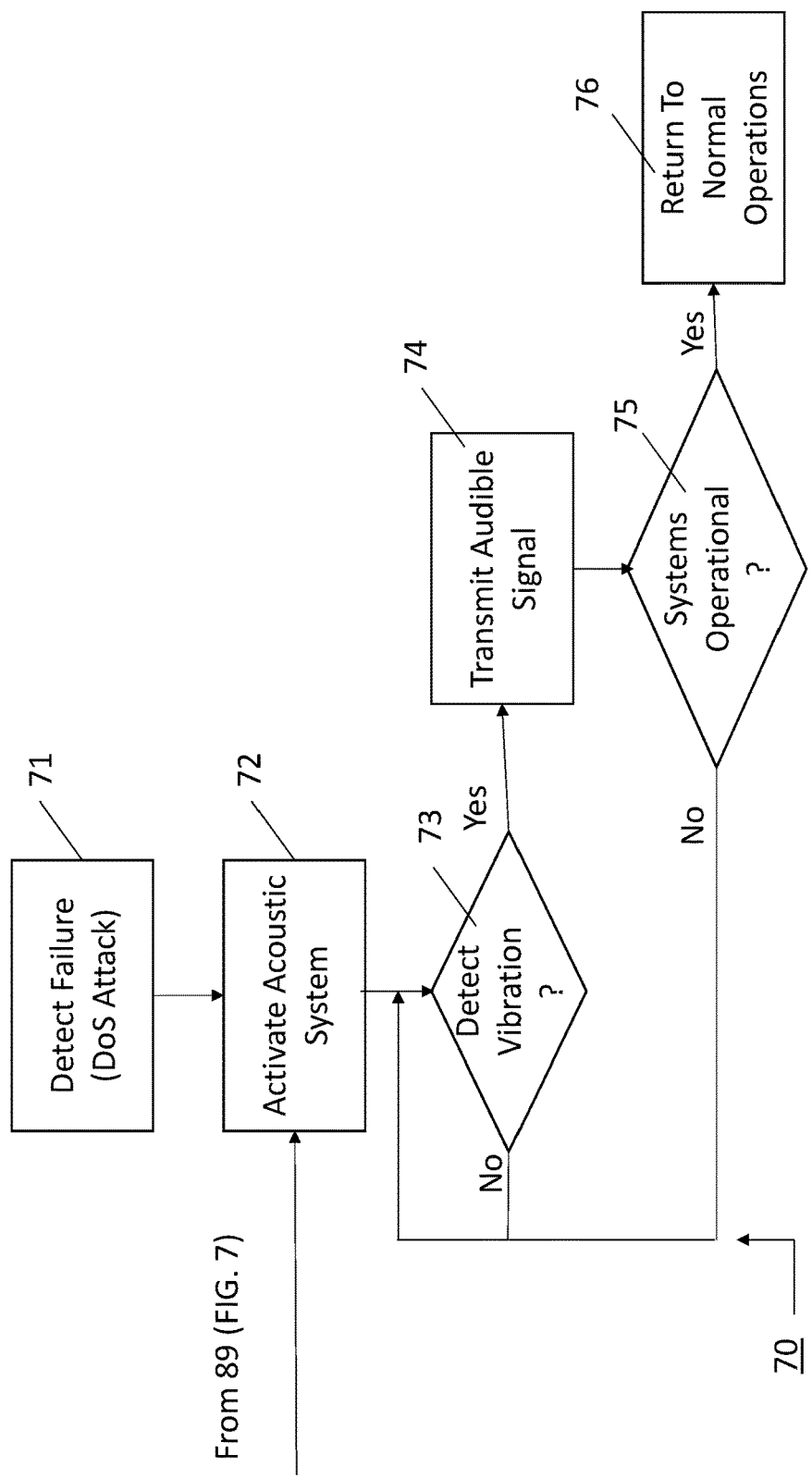
FIG. 6 is an illustration of an exemplary flow diagram of in accordance with the present disclosure.

Operations. In operation and with respect to FIG. 6, there is shown an exemplary flow diagram 70 from the perspective of a vehicle that has been compromised. The flow diagram starts with the detection of a failure by a vehicle at 71 which, for this example, will be considered a DoS attack. Upon detection of the Dos attack, at 72 the vehicle acoustic system may be activated. At 73, it is determined whether a recognizable vibration has been received from a passing vehicle or roadside equipment. If not, the process repeats at 73 until such a vibration signal has been detected. Once a vibration signal is received, an acoustic message is generated and transmitted at 74. The acoustic message may be in the audible range and may include one or more key words. At 75, the vehicle determines whether its systems are operational based on the emergency notification and if so, the vehicle continues in normal mode at 76. If not, the process repeats at 73.

Figure 7:
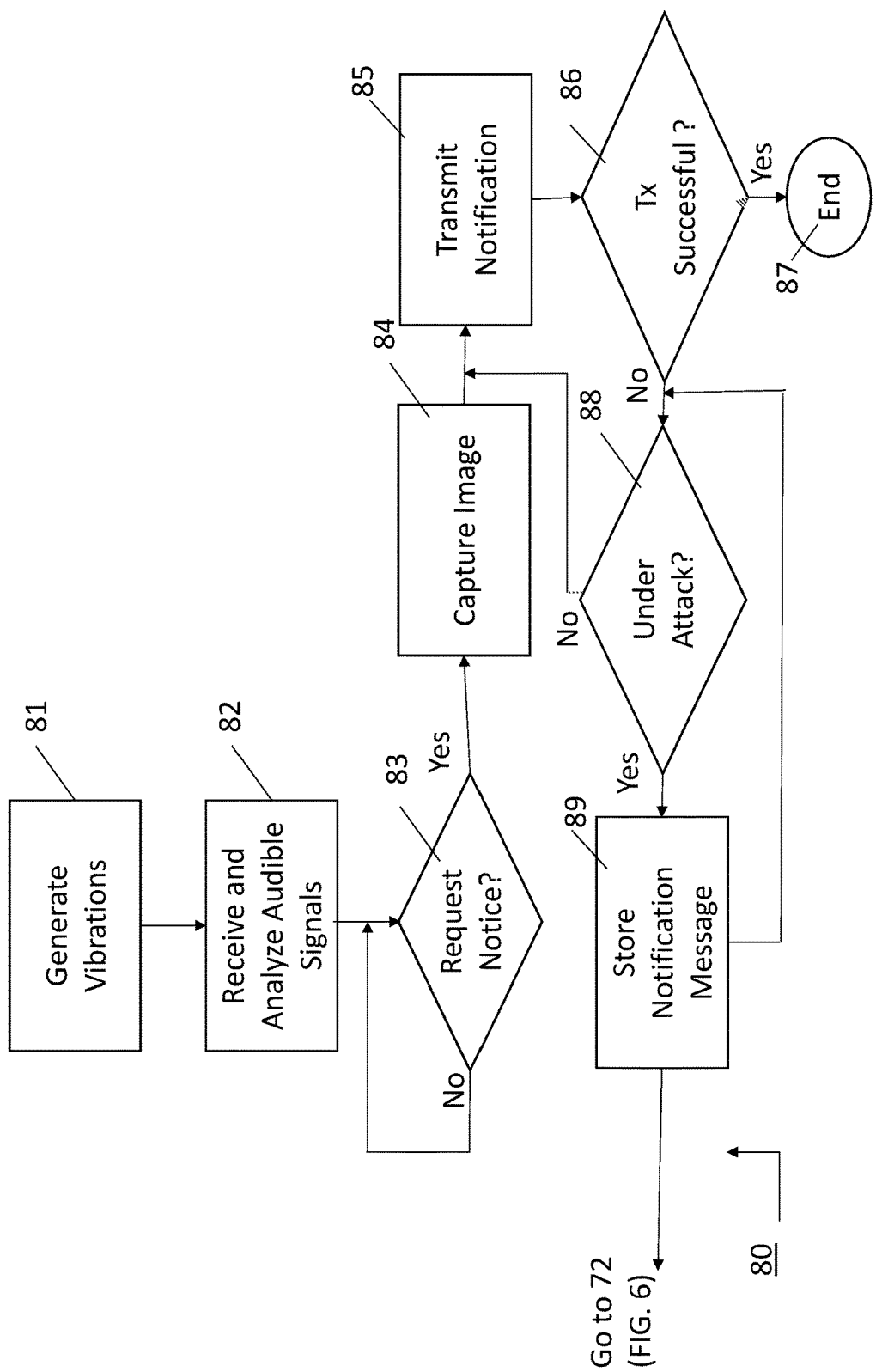
FIG. 7 is an illustration of an exemplary flow diagram of in accordance with the present disclosure.

With respect to FIG. 7, there is shown a flow diagram 80 from the perspective of a passing vehicle. At 81, the passing vehicle, through normal operations, may generate a vibration detectable by the compromised vehicle. At 82, the vehicle receives and analyzes an audible signal through its sound filter 53. At 83, it is determined whether the audible signal indicates that an emergency notification is requested. If so, an image of the compromised car may be captured at 84 and the emergency notification transmitted at 85. At 86, it is determined whether the transmission was successful. If the transmission was successful, the process ends at 87. If the transmission was not successful, it is determined whether the passing vehicle is itself a victim of a DoS attack at 88. If the passing vehicle is not under a Dos attack, the message is re-transmitted at 89 and the process continues at 85 until it is determined that the emergency notification has been successfully transmitted. If the passing vehicle is under DOS attack, the emergency notification is stored at 88 and the process continues at 87 until such time as the transmission of the emergency notification is successful. The passing vehicle may enable its own emergency acoustic procedures as set forth in FIG. 6. It will be noted that the transmission may be through the cellular system or roadside equipment.

With reference to FIG. 8, there is shown a flow diagram 90 from the perspective of a roadside equipment. At 91, the roadside equipment may generate vibrations to be picked up by a vehicle's acoustic system. At 92, in response to an audible transmission from the vehicle, the sound filter of the roadside equipment may hear the audible transmission and analyze the transmission for content. At 93, the camera on the roadside equipment may capture an image of the vehicle and at 94, the roadside equipment may generate and transmit an emergency notification.

While examples have been described in connection with various computing devices/processors, the underlying concepts may be applied to any computing device, processor, or system capable of facilitating a telecommunications system. The various techniques described herein may be implemented in connection with hardware or software or, where appropriate, with a combination of both. Thus, the methods and devices may take the form of program code (i.e., instructions) embodied in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, a computer-readable storage medium is not a signal. A computer-readable storage medium is not a transient signal. Further, a computer-readable storage medium is not a propagating signal. A computer-readable storage medium as described herein is an article of manufacture. When the program code is loaded into and executed by a machine, such as a computer, the machine becomes a device for telecommunications. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be a compiled or interpreted language and may be combined with hardware implementations.

The methods and devices associated with the disclosed system as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an device for implementing telecommunications as described herein. When implemented on a general-purpose processor, the program code combines with the processor to provide a unique device that operates to invoke the functionality of a telecommunications system.

While a system has been described in connection with the various examples of the various figures, it is to be understood that other similar implementations may be used, or modifications and additions may be made to the described examples of a telecommunications system without deviating therefrom. For example, one skilled in the art will recognize that system as described in the instant application may apply to any environment, whether wired or wireless, and may be applied to any number of such devices connected via a communications network and interacting across the network. Therefore, a telecommunications system as described herein should not be limited to any single example, but rather should be construed in breadth and scope in accordance with the appended claims.

The invention claimed is:

1. A method comprising:
generating, by an apparatus including a processor, a vibrating signal, wherein the vibrating signal is received via an acoustic system at vehicle, wherein the apparatus comprises roadside equipment;
receiving, by the apparatus, an audible signal from the vehicle responsive to the vehicle receiving the vibrating signal and the vehicle detecting an inoperable telecommunications interface associated with the vehicle; and
responsive to receiving the audible signal from the vehicle:
capturing, by the apparatus, an image of the vehicle; and
transmitting, by the apparatus, a notification associated with the image of the vehicle according to the audible signal.

2. The method of claim 1, further comprising analyzing, by the apparatus, the audible signal to determine content, wherein the notification includes information associated with the content.

3. The method of claim 1, wherein the audible signal from the vehicle includes words in a human vocabulary.

4. The method of claim 1, wherein the audible signal received from the vehicle is a distress signal.

5. The method of claim 4, wherein the distress signal is a result of a denial of service attack at the vehicle.

6. The method of claim 1, wherein the notification is received at a server, and wherein the vehicle is configured to avoid generating the audible signal when the telecommunications interface is operable.

7. The method of claim 6, wherein the server determines an identity of the vehicle according to the notification.

8. The method of claim 6, wherein the server facilitates assistance to the vehicle according to the notification.

9. An apparatus, comprising:
a processing system including a processor; and
a memory that stores executable instructions that, when executed by the processing system, facilitate performance of operations, the operations comprising:
generating a vibrating signal, wherein the vibrating signal is received via an acoustic system at a vehicle, wherein the apparatus comprises roadside equipment;
receiving an audible signal from the vehicle responsive to the vehicle receiving the vibrating signal and the vehicle detecting an inoperable telecommunications interface associated with the vehicle; and
responsive to receiving the audible signal from the vehicle, transmitting a notification associated with an image of the vehicle according to the audible signal.

10. The apparatus of claim 9, wherein the operations further comprise capturing an image of the vehicle, and wherein the vehicle is configured to avoid generating the audible signal when the telecommunications interface is operable.

11. The apparatus of claim 9, wherein the operations further comprise analyzing the audible signal to determine content, wherein the notification includes information associated with the content.

12. The apparatus of claim 9, wherein the audible signal received from the vehicle is a distress signal.

13. The apparatus of claim 12, wherein the distress signal is a result of a denial of service attack at the vehicle.

14. The apparatus of claim 9, wherein the notification is received at a server that determines an identity of the vehicle according to the notification.

15. The apparatus of claim 9, wherein the notification is received at a server that facilitates assistance to the vehicle according to the notification.

16. A non-transitory machine-readable medium, comprising executable instructions that, when executed by a processing system including a processor, facilitate performance of operations at an apparatus, the operations comprising:
generating a vibrating signal, wherein the vibrating signal is received via an acoustic system at a vehicle;
receiving an audible signal from the vehicle responsive to the vehicle receiving the vibrating signal and the vehicle detecting an inoperable sensor associated with the vehicle, wherein the vehicle is configured to avoid generating the audible signal when the sensor associated with the vehicle is operable; and
responsive to receiving the audible signal from the vehicle:
capturing an image of the vehicle; and
transmitting a notification associated with the image of the vehicle according to the audible signal.

17. The non-transitory machine-readable medium of claim 16, wherein the apparatus comprises roadside equipment.

18. The non-transitory machine-readable medium of claim 16, wherein the operations further comprise analyzing the audible signal to determine content, wherein the notification includes information associated with the content.

19. The non-transitory machine-readable medium of claim 16, wherein the audible signal received from the vehicle is a distress signal that is a result of a denial of service attack at the vehicle.

20. The non-transitory machine-readable medium of claim 16, wherein the notification is received at a server that facilitates assistance to the vehicle according to the notification.

* * * * *